United States Patent
Avila et al.

[11] Patent Number: 5,821,942
[45] Date of Patent: Oct. 13, 1998

[54] RAY TRACING THROUGH AN ORDERED ARRAY

[75] Inventors: Ricardo Scott Avila; Lisa Marie Sobierajski, both of Niskayuna; Harvey Ellis Cline, Schenectady; William Edward Lorensen, Ballston Lake, all of N.Y.

[73] Assignee: General Electric Company, Schenectady, N.Y.

[21] Appl. No.: 622,639

[22] Filed: Mar. 27, 1996

[51] Int. Cl.⁶ .................................................... G06T 15/40
[52] U.S. Cl. ............................................ 345/424; 345/421
[58] Field of Search .................................. 345/429, 424, 345/421, 426

[56] References Cited

U.S. PATENT DOCUMENTS

| | | | |
|---|---|---|---|
| 4,719,585 | 1/1988 | Cline et al. | 345/424 |
| 5,038,302 | 8/1991 | Kayfman | 345/424 |
| 5,563,989 | 10/1996 | Billyard | 345/426 |
| 5,579,454 | 11/1996 | Billyard et al. | 345/421 |

Primary Examiner—Phu K. Nguyen
Assistant Examiner—Huedung Cao
Attorney, Agent, or Firm—Lawrence P. Zale; Marvin Snyder

[57] ABSTRACT

A system for displaying sets of surface cubes with gradient vertex vectors first employs a pointer table constructed to order the surface cubes so as to generally cause a row by row and layer by layer ordering during model creation. During display, a viewpoint is selected and a scan controller causes cubes to be displayed according to this order of the pointer table. A test backprojection of cubes to image plane is performed to determine which pixels will be impinged by the cubes. For pixels which have not been updated, or pixels which have been updated by a less superficial cube than the current cube, projection rays are created through the center of impinged pixels in a direction opposite that of the backprojection. An intersection point of the ray with a surface within a current cube is determined. The data value and gradient vectors for the current cube are interpolated at this intersection point. These interpolated vector and value are then rendered to produce and image with less distortion and with less processing complexity.

8 Claims, 1 Drawing Sheet

RAY TRACING THROUGH AN ORDERED ARRAY

BACKGROUND OF THE INVENTION

1. Field of the Invention

This invention relates to a system for creating computer graphic models and rapidly displaying the models with reduced distortion.

2. Description of Related Art

A recently developed method of model creation, described in a co-pending application "3-D Surfaces Generated From A List Of Cubic Elements" by Cline, Lorensen (U.S. patent application Ser. No. 08/813,811) describes defining surfaces with a cube/normal model where surfaces are modeled with separate individual cells, each being a cube which straddles the surface, and gradient vectors associated with each of the vertices of each cube. These cube/normal models could be displayed using tessellation and conversion to polygons, then displayed by conventional CAD/CAM model display methods. These type of displays may be computationally burdensome, causing it to be slow.

Another method of display described in the aforementioned application, utilizes a type of backprojection, which is computationally less burdensome than the above-mentioned CAD/CAM display method. This type of backprojection may not cause the model data to impinge onto the center of an image pixel of an image plane, causing some distortion.

Other conventional model types which are created from separate cells, such as polygonal models, may be displayed using the methods above, slightly modified. These tend to be a tradeoff of accuracy and speed.

Therefore there is a need for a computer graphic system which displays model data with less distortion than conventional methods, in a rapid manner.

SUMMARY OF THE INVENTION

A graphics system displays surface models, such as a cube/vector model comprised of a plurality of cubes which straddle a surface. The cube/vector model has cubes with 8 vertices with each vertex having a data value, location, and gradient vector.

In a preferred embodiment, a pointer table with indices identifying an order of the cubes may be provided with the surface model, or created by a cube scanner in a row-by-row and layer-by-layer fashion.

A separate memory may be used to store the cube model and the pointer table, or they may be stored at different locations within a common memory.

A viewdata analysis device receives a view vector from an operator from which to view the model. It determines the vector components in the same coordinate system as which the model was defined.

A scan controller selects a next pointer table entry from the pointer table memory. The scanning is dependent upon the sign of the vector component. If the x component of the view vector is negative, the x indices of the cube model are scanned from largest x index to smallest. This is also true of the y and z components of the view vector.

Each entry is used as the current surface cube, and processed in that manner.

A ray backprojection device operates to determine pixels of an image plane impinged by backprojecting the current surface cube to an image plane defined by the operator. It also determines the minimum distance of the surface cube to the image plane.

Impinged pixels which have not yet been updated, or have been updated with a distance which is greater than the computed minimum vertex distance, are passed to a ray forward projection device.

Forward projection device receives a viewpoint from the operator form which to view the model. It calculates a ray passing through the viewpoint and a center point of the impinged pixels it receives.

A cube intersection device coupled to the cube model memory receives current cube data and the ray defined by forward ray projection device, and determines a surface intersection point where the rays received from the forward projection device intersect a surface defined within the current cube.

An interpolation device coupled to the cube intersection device receives the surface intersection point from the cube intersection device, and the gradient vectors of the current surface cube from the surface cube memory, and interpolates a normal surface vector at the surface intersection point.

A shader updates the impinged pixel with a color and intensity related to the normal surface vector. The scan controller then walks through all surface cubes to create a more accurate representation of a surface, with less processing. Effectively, only visible surfaces are processed since surface cubes behind more superficial cubes are not processed by the forward projection device.

OBJECTS OF THE INVENTION

It is an object of the present invention to provide a computer graphic system which rapidly displays surfaces with greater accuracy.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
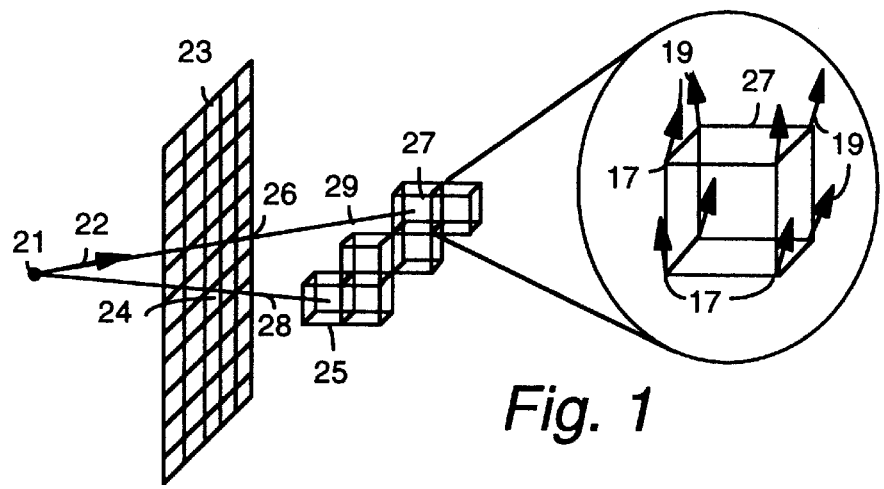
FIG. 1 is an illustration of the cubes and gradient vectors of a cube/vector model and the relative geometry of the model, viewpoint and image plane.

In FIG. 1, a viewpoint 21 is chosen to view a computer model. In this case, cubes 25 and 27 represent surface cubes of the cube/vector model used for illustration purposes, but any other computer surface model may be used which is comprised of separate cells, such as cubes 25, 27. Eight data values 17 are used as vertices to define a cube. Cubes which straddle a surface are surface cubes and stored as cubes of the model. Surface cubes which straddle a surface have vertices with at least one vertex below a threshold and at least one other vertices at or above the threshold. This threshold may be provided by an operator.

A gradient vector 19 for each vertex is determined by calculating differences in adjacent data values in all dimensions. Each difference results in a component of the gradient vector.

This is repeated for all vertices of surface cubes and stored as the cube/vector model. The apparatus and method is described in the co-pending application (U.S. patent application Ser. No. 08/813,811) by Cline, Lorensen.

In a conventional backprojection method, a ray 29 passing from viewpoint 21 through image plane 23 and through model cube 27 would pass through a corner of image pixel 26. Image pixel 26 will then be attributed the values derived from model cube 25 for the entire pixel, since pixels are indivisible.

Similarly, a ray 28 passes through cube 25 and impinges upon a corner of pixel 24. Therefore, there is an inherent misalignment problem, due to the geometry in backprojection techniques, which manifests itself as distortion in the image.

Figure 2:
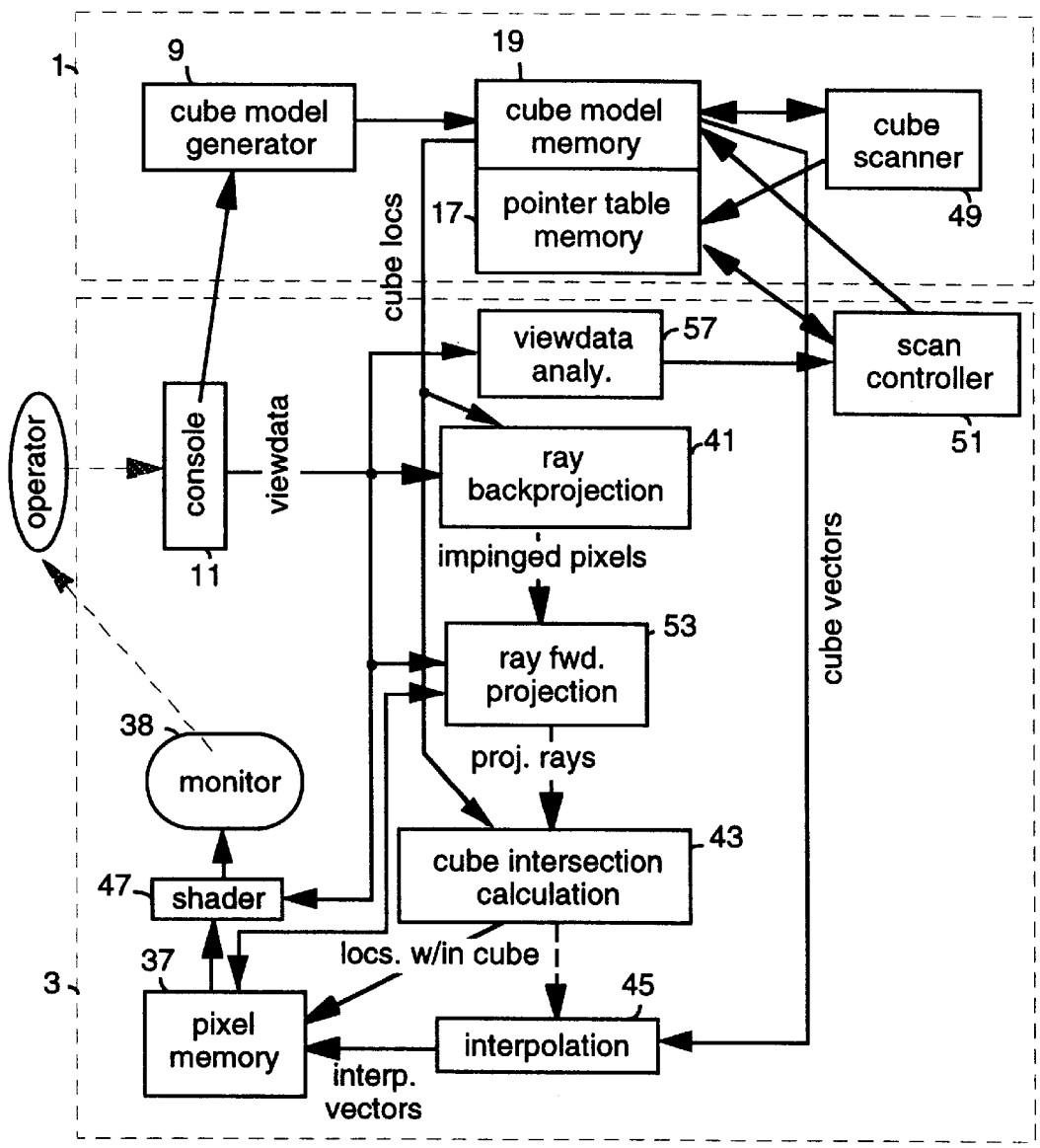
FIG. 2 is a simplified block diagram of a computer graphic modeling system according to the present invention.

In FIG. 2, a model generator is shown. Volumetric data is provided to cube/vector model generator 9 which may be acquired from any one of many numerous different devices. Data may also be acquired by converting geometric data to a volumetric representation through a process known as "voxelization". Also, volumetric data can be the result of a simulation process. This may be computed axial tomography (CAT), magnetic resonant imaging (MRI), SONAR, RADAR, or other types of volumetric data.

A cube/vector model generator 9 employs the volumetric data to create a computer model comprised of cubes which straddle a surface to be imaged, and gradient vectors at each vertex of each cube. The cube/vector data is then stored in a cube model memory 19 for later display.

Optionally, a cube scanner 49 in a sequential fashion scans through three dimensions, as in three "nested" loop fashion, to scan through the surface cubes in surface cube memory 19. Cube scanner 49 selects a fixed Y and Z coordinate and scans for the X coordinates to determine a surface cube it encounters in a "row". The process continues with a new incremented Y value with the same Z value and scans through the next row in which X varies. All rows having the same Y value are a layer.

When a surface cube is encountered, its index is stored in a pointer table memory 17. Pointer table memory 17 need not store empty rows which do not contain a surface cube.

This is repeated until all surface cubes in each row of all layers have been identified by surface cube scanner 49 and have been indexed in the pointer table memory 17. It is important to note at this point that the surface cube information is not stored in pointer table memory, but only a pointer which is the index of the surface cube in surface cube memory 19. For example, if the third entry in the surface cube memory is a surface cube which is to be stored in the pointer table memory next, the index 3 will appear in pointer table memory 17 in the next available location. These indices may be adjusted to indicate an actual raw memory location within surface cube memory 19.

After cube scanner 49 has scanned through the entire surface cube memory 19, a resulting pointer table in pointer table memory 17 holds all the indices of the surface cubes in an order which is generated by first varying X to span row by row, then Y to cover a layer, then span through Z to cover the entire surface cube volume. At this point, surface cube memory 19 and its contents, and pointer table memory 17 and its contents, may be used to model surfaces.

Now that the model has been built, it may be displayed by the rendering apparatus 3. A cube/vector model is rendered in this example, but other types of computer models comprised of separate cells may be employed with minor modification.

When it is time to display the surfaces, the operator provides view data through a console 11, which defines the view vector to view the model. The operator, either directly or indirectly, defines image plane 23, as shown in FIG. 1. Typically the image plane is perpendicular to the operator's viewing direction as defined by a vector 22 in three dimensions having an X component, a Y component and a Z component. View vector 22 is provided to viewpoint analysis device 57, ray back projection device 41 and ray forward projection device 53 all of FIG. 2.

View data analysis device 57 determines the components of the view vector and using the same coordinate system in which the model is defined determines if each component is positive or negative. The sign of each component of the view vector is passed to a scan controller 51.

Scan controller 51 then scans through entries of the pointer table memory corresponding to a row from lowest index to highest index if the X component of the viewpoint vector is positive, and from highest index to lowest index if the X component of the viewpoint vector is negative.

Similarly, after each of the rows is scanned (scanning the indices which correspond to the X dimension of the model), other Y values are used. The Y values are scanned in the same basic manner as the X value indices. For example, if the Y component of the viewpoint vector is positive, the Y index starts at the lowest value and works its way to the highest Y value for each Z value. Similarly, the Z component of the viewpoint vector determines the initial Z value index and the direction in which the Z value indices are scanned.

For example, if the Z component of the viewpoint vector is positive, the lowest Z value index is used as the initial index, and the Z value indices are increased up to the maximum Z value index.

The scan controller 51 requests a next surface cube index from pointer table memory 17. This surface cube index is passed to surface cube memory 19 to cause the information relating to that surface cube to be passed to a cube intersection calculation device 43 and an interpolation device 45, which will be described later.

In an optional embodiment, scan controller 51 may simply scan through the addresses of cube model memory directly without using the pointer table.

Ray backprojection device 41 receives the location of the vertices of the current surface cube (the one which has been indexed by scan controller 51) and determines, along with the viewing angle and image plane provided by the operator, pixels which would be impinged by a projection of the current surface cube onto image plane 23. The ray backprojection device also computes the distance of the cube to the image plane. These impinged pixels and the distance value are then passed to a ray forward projection device 53.

Ray projection device 53 has received the viewpoint and view vector from the operator through console 11, and reads the distance from the image plane of a closest surface cube to update each impinged pixel. For pixels which have not yet been updated, or ("blank pixels"), and for pixels which have been updated by surface cubes further from the image plane that the current surface cube, ray forward projection device 53 determines a ray, or set of rays, passing from the viewpoint through the center of the impinged pixels back toward the surface cubes.

By the inherent nature of the pointer table memory in the organization, it causes the most superficial surface cubes of surface cube memory 19 to be drawn without having to calculate surfaces from deeper lying surface cubes and update pixels over and over. This greatly reduces processing required for display and results in an accurate image.

A cube intersection calculation device 43 receives the cube vertex locations, vertex data values, and the projection rays which were created by ray forward projection device 53. It determines where the projection rays would intersect the surface contained in each cube.

The intersection calculation device 43 determines the distance of the surface intersection point to the image plane. If this distance is less than the distance associated with this pixel stored in a pixel memory device 37, it is used to update the pixel memory 37 for this pixel. Otherwise, no further processing is required for this ray. Pixel memory device is initialized with a predetermined value representing a distance much larger than would be expected for any of the pixels.

There are many conventional methods of determining the intersection of a ray and surface, many of which will apply here and need not be described in detail.

The surface intersection point is passed to an interpolation device 45 and a pixel memory 37. Interpolation device 45 receives the gradient vectors, associated with each vertex of the surface cube from cube model memory 19. Interpolation device 45 interpolates these gradient vectors at the surface intersection point within the cube to result in an interpolated vector. The interpolated vector is then stored with its associated surface intersection point in pixel memory 37.

A shader 47 reads the surface intersection point, the interpolated vector and data value associated with the intersection location, and any shading parameters associated with this surface (e.g., reflectance coefficients, texture), and employs a shading calculation to determine the pixel intensity and/or color. Shader 47 then provides an image on monitor 38 to the operator.

While several presently preferred embodiments of the present novel invention have been described in detail herein, many modifications and variations will now become apparent to those skilled in the art. It is our intent therefore, to be limited only by the scope of the appending claims and not by the specific details presented by way of illustration.

What we claim is:

1. A method of displaying surfaces modeled by surface cubes which straddle the surface, each cube comprising 8 vertices with each vertex having a data value, location, and gradient vector, comprising the steps of:
    a) creating a pointer table that contains indices to all surface cubes;
    b) receiving a viewpoint vector;
    c) determining an order to scan through the pointer table entries based upon the viewpoint vector that will result in an approximate front-to-back ordering of the surface cubes;
    d) selecting the first pointer table entry;
    e) backprojecting the selected surface cube to an image plane to determine the image plane pixels impinged, and the minimum distance between each of the surface cube vertices and the image plane, being a minimum vertex distance;
    f) if the impinged pixel has an associated surface intersection distance which is less than the minimum vertex distance, then skipping the following steps up to step "k";
    g) computing a ray through the center point of the impinged pixel;
    h) using the ray and the data values of the surface cube to determine a surface intersection point where the ray intersects the surface contained within the surface cube;
    i) interpolating the gradient vectors at the surface intersection point to determine an interpolated gradient vector;
    j) performing shading based on the intersection point and gradient vector, and storing the resulting shading value and the intersection distance in the impinged pixel;
    k) repeating steps "f" through "j" for each impinged pixel;
    l) selecting the next pointer table entry according to the order determined in step "c"; and
    m) repeating steps "e" through "l" for each pointer table entry.

2. The method of displaying surfaces of claim 1 wherein the step of creating a pointer table comprising the steps of:
    a) assigning an index to each surface cube that can be used to identify that cube;
    b) setting z to an initial value;
    c) setting y to an initial value;
    d) setting x to an initial value;
    e) storing the index of each surface cube encountered having a location encompassing the location (x,y,z), and an indication of an associated x, y, z, index as a next entry in the pointer table;
    f) incrementing x;
    g) repeating steps "e"–"f" for a plurality x values defining a row;
    h) incrementing y;
    i) repeating steps "d"–"h" for a plurality y values defining a layer;
    j) incrementing z;
    k) repeating steps "c"–"j" for a plurality z values completing the table.

3. The method of displaying surfaces of claim 1 wherein the step of determining an order to scan through the pointer table entries comprising the steps of:
    a) determining the polarity of a component of the viewing vector along a z direction, the z component, and increasing an z index of the pointer table if the polarity is positive, and decreasing z index if the polarity is negative;
    b) determining the polarity of a component of the viewing vector along a y direction, the y component, and increasing an y index of the pointer table if the polarity is positive, and decreasing y index if the polarity is negative; and
    c) determining the polarity of a component of the viewing vector along a x direction, the x component, and increasing an x index of the pointer table if the polarity is positive, and decreasing x index if the polarity is negative.

4. The method of displaying surfaces of claim 1 wherein the step of selecting the first pointer table entry comprising the steps of:
    a) determining the polarity of the z component of the viewing vector and selecting a minimum z index of the pointer table if the polarity is positive, and selecting a maximum z index of the pointer table if the polarity is negative;
    b) determining the polarity of the y component of the viewing vector and selecting a minimum y index of the pointer table if the polarity is positive, and selecting a maximum z index of the pointer table if the polarity is negative;
    c) determining the polarity of the y component of the viewing vector and selecting a minimum y index of the pointer table if the polarity is positive, and selecting a maximum y index of the pointer table if the polarity is negative.

5. A graphics system for displaying surfaces modeled by surface cubes which straddle the surface, each cube comprising 8 vertices with each vertex having a data value, location, and gradient vector, and a pointer table containing indices providing an order to the surface cubes comprising:

a) a cube model memory, containing surface cubes;

b) a pointer table memory for storing said surface cube indices;

c) a view data analysis device capable of receiving a view data vector and determining components of the view data vector;

d) a scan controller coupled to the view data analysis device for receiving the components of the view data vector, selecting a next pointer table entry from the pointer table memory with an index determined by the components of the view data vector, and extracting a current surface cube corresponding to this index;

e) a ray backprojection device operating to determine pixels of an image plane impinged by backprojecting the current surface cube to a viewpoint, and determine a distance of the current surface cube to the image plane;

f) a ray forward projection device coupled to the ray backprojection device for receiving the impinged pixels, calculating a ray passing through the viewpoint and a center point of the impinged pixels which have not yet been updated, or which have been updated with a distance greater than the distance of the current surface cube to the image plane;

g) a cube intersection device coupled to the cube model memory operating to receive current cube data, and the ray defined by forward ray projection device, and determine a surface intersection point where the ray intersects a surface defined within the current cube;

h) an interpolation device coupled to the cube intersection device, operating to receive the surface intersection point and the gradient vectors of the current surface cube, and to interpolate a normal surface vector at the surface intersection point; and i) a shader for updating the impinged pixel with a color and intensity related to the normal surface vector.

6. A graphics system of claim 5 further comprising: a cube scanner coupled to the cube model memory and pointer table memory, for providing addresses scanning through the cube model memory in a predefined order, capable of identifying indices of surface cubes stored in a memory and for storing the indices in a pointer table memory creating said pointer table.

7. A method of displaying surface models comprised of a plurality of separate cells, each containing surface information, comprising the steps of:

a) creating a pointer table for the surface model containing the surface cell information;

b) receiving information defining a viewpoint and image plane, comprised of pixels;

c) selecting a cell of the model using the pointer table;

d) determining the distance from the image plane;

e) backprojecting the cell toward the image plane to determine pixels impinged;

f) determining if the pixels have previously been updated by a cell closer to the image plane;

g) for pixels which have not been updated by a closer cell:
forward projecting rays through the center of impinged pixels toward the model, and
for rays which intersect the cell:
determining where the ray intercepts the cell,
interpolating the surface information of the cell at the cell interception point, and
updating the impinged pixel on that ray.

8. The method of claim 7 further comprising the step of repeating steps "b"–"f" for a plurality of different cells.

* * * * *